United States Patent
Sengupta et al.

(10) Patent No.: US 11,959,036 B2
(45) Date of Patent: Apr. 16, 2024

(54) TUNING THE ZETA POTENTIAL OF SURFACES FOR COKE MITIGATION IN FUEL AND OIL SYSTEMS

(71) Applicant: General Electric Company, Schenectady, NY (US)

(72) Inventors: Arundhati Sengupta, Bengaluru (IN); Karthick Gourishankar, Bengaluru (IN); Narayanan Janakiraman, Bengaluru (IN); Lawrence B. Kool, Clifton Park, NY (US); Sanjay Kumar Sondhi, Bengaluru (IN); Michael A Benjamin, Cincinnati, OH (US); Hejie Li, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/815,637

(22) Filed: Jul. 28, 2022

(65) Prior Publication Data

US 2023/0303940 A1  Sep. 28, 2023

(30) Foreign Application Priority Data

Mar. 22, 2022 (IN) ............................. 202211015727

(51) Int. Cl.
*C10L 10/04* (2006.01)
*F02C 3/24* (2006.01)
*F02C 7/22* (2006.01)

(52) U.S. Cl.
CPC ............... *C10L 10/04* (2013.01); *F02C 3/24* (2013.01); *F02C 7/22* (2013.01);
(Continued)

(58) Field of Classification Search
CPC ............... C10L 10/04; C10L 2200/043; C10L 2230/04; C10L 2250/04; C10L 2270/04; F02C 3/24; F02C 7/22; F05D 2260/95
See application file for complete search history.

(56) References Cited

U.S. PATENT DOCUMENTS 3,557,232 A    1/1971  Starnes, Jr.
4,122,033 A    10/1978 Black
(Continued)

FOREIGN PATENT DOCUMENTS

CN    107641788 A    1/2018
CN    111040480 B    8/2021
(Continued)

OTHER PUBLICATIONS

Sengupta et al., "Zn2+-Silica Modified Cobalt Ferrite Magnetic Nanostructured Composite for Efficient Adsorption of Cationic Pollutants from Water," ACS Sustainable Chemistry & Engineering, vol. 5, pp. 1280-1286 (2017).

(Continued)

*Primary Examiner* — Ellen M McAvoy
*Assistant Examiner* — Chantel Graham
(74) *Attorney, Agent, or Firm* — Venable LLP; Michele V. Frank (57) ABSTRACT

A component and a system for mitigating coke formation during delivery of a hydrocarbon fluid. The component includes a contact surface configured to be in contact with the hydrocarbon fluid. Tuning the zeta potential of the contact surface allows selective attraction and/or repulsion of coke-catalyzing materials, metal ions, heteroatomic hydrocarbons, and/or coke precursors present in the hydrocarbon fluid. A method of mitigating coke formation during delivery of a hydrocarbon fluid includes tuning a zeta potential of the contact surface of the component and (Continued)

injecting or circulating the hydrocarbon fluid through the system such that the contact surface selectively attracts and/or repels coke-catalyzing materials, metal ions, heteroatomic hydrocarbons, and/or coke precursors present in the hydrocarbon fluid.

20 Claims, 2 Drawing Sheets

(52) U.S. Cl.
CPC ..... *C10L 2200/043* (2013.01); *C10L 2230/04* (2013.01); *C10L 2250/04* (2013.01); *C10L 2270/04* (2013.01); *F05D 2260/95* (2013.01)

(56) References Cited

U.S. PATENT DOCUMENTS

| | | | |
|---|---|---|---|
| 4,427,560 | A | 1/1984 | Holstedt et al. |
| 4,477,259 | A * | 10/1984 | Funk ................ C10L 1/326 |
| | | | 44/280 |
| 4,500,602 | A | 2/1985 | Patten et al. |
| 5,725,955 | A | 3/1998 | Tawil et al. |
| 5,759,622 | A | 6/1998 | Stover |
| 6,884,467 | B2 | 4/2005 | Walker et al. |
| 7,484,672 | B2 | 2/2009 | Campion et al. |
| 7,641,941 | B2 | 1/2010 | Mazany et al. |
| 8,128,887 | B2 | 3/2012 | Bradley et al. |
| 8,401,169 | B2 | 3/2013 | Ku et al. |
| 9,033,256 | B2 | 5/2015 | Imoehl |
| 9,194,280 | B2 | 11/2015 | Berkemeier et al. |
| 10,844,788 | B2 | 11/2020 | Zhang et al. |
| 11,168,643 | B2 | 11/2021 | Lineton et al. |
| 2004/0188323 | A1 | 9/2004 | Tzatzov et al. |
| 2007/0264491 | A1 | 11/2007 | Asano et al. |
| 2010/0266770 | A1 | 10/2010 | Mazany et al. |
| 2011/0100015 | A1 | 5/2011 | Alagappan et al. |
| 2012/0125844 | A1 | 5/2012 | Dongare et al. |
| 2014/0227511 | A1 | 8/2014 | Mazany |
| 2017/0267595 | A1 | 9/2017 | Mazany |

FOREIGN PATENT DOCUMENTS

| | | | |
|---|---|---|---|
| EP | 1016736 A1 | 7/2000 | |
| EP | 0874066 B1 | 8/2002 | |
| WO | 84/01169 A1 | 3/1984 | |
| WO | WO-2009101974 A1 * | 8/2009 | ............ B82Y 30/00 |
| WO | 2020/180774 A1 | 9/2020 | |

OTHER PUBLICATIONS

Dai et al., "Dually Charged MOF-Based Thin-Film Nanocomposite Nanofiltration Membrane for Enhanced Removal of Charged Pharmaceutically Active Compounds," Environmental Science & Technology, vol. 54, pp. 7619-7628 (2020).

Cheng et al., "Positively charged microporous ceramic membrane for the removal of Titan Yellow through electrostatic adsorption," Journal of Environmental Sciences, vol. 44, pp. 204-212 (2016).

Wei et al., "Negatively charged polyimide nanofiltration membranes with high selectivity and performance stability by optimization of synergistic imidization," Journal of Membrane Science, vol. 563, pp. 752-761 (2018).

Speight, "The chemistry and physics of coking," Korean Journal of Chemical Engineering, vol. 15, pp. 1-8 (1998).

Jia et al., "A comprehensive review of the thermal oxidation stability of jet fuels," Chemical Engineering Science, vol. 229, 116157, pp. 1-23 (2021).

Betts et al., "The conversion of metal catalysts into inhibitors of autoxidation," Die Makromolekulare Chemie, vol. 95, pp. 22-39 (1966).

Copping et al., "Catalytic and inhibitory effects of metal chelates in autoxidation reaction," Discussions of the Faraday Society, vol. 46, pp. 202-212 (1968).

Watkinson et al., "Chemical reaction fouling: A review," Experimental Thermal and Fluid Science, vol. 14, pp. 361-374 (1997).

* cited by examiner

FIG. 1

FIG. 2

TUNING THE ZETA POTENTIAL OF SURFACES FOR COKE MITIGATION IN FUEL AND OIL SYSTEMS

CROSS REFERENCE TO RELATED APPLICATIONS

The present application claims the benefit of Indian Patent Application No. 202211015727, filed on Mar. 22, 2022, which is hereby incorporated by reference herein in its entirety.

TECHNICAL FIELD

The present disclosure relates to components and systems in contact with hydrocarbon fluids, particularly, components for gas turbine engines for aircraft, and methods of preparing the same.

BACKGROUND

Gas turbine engines include surfaces that contact hydrocarbon fluids, such as fuels and lubricating oils. Carbonaceous deposits (also known as coke) may form on these surfaces when exposed to the hydrocarbon fluids at elevated temperatures, resulting in carbon becoming attached and building up as deposits on surfaces contacted by a fuel or oil.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

The terms "upstream" and "downstream" refer to the relative direction with respect to fluid flow in a fluid pathway. For example, "upstream" refers to the direction from which the fluid flows, and "downstream" refers to the direction to which the fluid flows. The term "fluid" may be a gas or a liquid. The term "fluid communication" means that a fluid is capable of making the connection between the areas specified.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 1, 2, 4, 5, 10, 15, or 20 percent margin in either individual values, range(s) of values and/or endpoints defining range(s) of values. Here and throughout the specification and claims, range limitations may be combined and/or interchanged. Such ranges are identified and include all the sub-ranges contained therein unless context or language indicates otherwise As used herein, the term "zeta potential" refers to an electrical potential difference between a dispersion medium and a stationary layer of fluid attached to a dispersed particle.

As used herein, the term "surface potential" refers to an electrical potential difference between a dispersion medium and a surface of a dispersed particle.

Various embodiments are discussed in detail below. While specific embodiments are discussed, this is done for illustration purposes only. A person skilled in the relevant art will recognize that other components and configurations may be used without departing from the spirit and the scope of the present disclosure.

As noted above, coke deposition may occur on surfaces of a gas turbine engine that are exposed to hydrocarbon fluids, such as fuels and lubricating oils, at elevated temperatures. Such carbon deposits may develop if the fluid circuit is operated or closed without the remaining stagnant fuel being purged. As the deposits collect, they can become sufficiently large to reduce or even to obstruct fluid flow. In the case of a fuel circuit, such carbon deposition can lead to degraded engine performance, reduced heat transfer efficiencies, increased pressure drops, and increased rates of material erosion, all of which can necessitate the use of expensive de-coking procedures and even replacement of fuel nozzles. The present disclosure discusses ways to prevent such carbon deposits on a surface of a component that contacts hydrocarbon fluids, and, particularly, to such components used in a gas turbine engine for an aircraft. Preferred embodiments described herein relate to components, systems, and methods for preventing carbon deposits from hydrocarbon fluids at elevated temperatures. In particular, the embodiments relate to modifying an internal surface wetted by, or in contact with, the hydrocarbon fluid.

The hydrocarbon fluid may include metal ion impurities originating from the hydrocarbon fluid contacting metal components during the manufacture, storage, or transport of the hydrocarbon fluid. Although these metal ion impurities may exist in trace quantities (on the order of parts per billion or a few parts per million), these trace quantities can be sufficient to accelerate fuel oxidation and coke deposition. Non-limiting examples of metal ion impurities include cations of heavy metals and transition metals such as lead, copper, zinc, cobalt, iron, nickel, chromium, manganese, and vanadium, and cations of alkaline earth metals such as magnesium.

The hydrocarbon fluid may include polar species containing heteroatoms such as sulfur, nitrogen, and/or oxygen, which at suitable conditions of fluid stressing can form soluble and/or insoluble coke precursors (also containing heteroatoms) that can eventually form coke which can deposit onto surfaces. Although these polar species may exist in trace quantities (on the order of parts per billion or a few parts per million), these trace quantities can be sufficient to form coke deposits. Non-limiting examples of the polar species include non-aromatic heteroatomic hydrocarbons and aromatic heteroatomic hydrocarbons. Non-limiting examples of non-aromatic heteroatomic hydrocarbons include aziridine, ethylene oxide, thiirane, oxetane, azetidine, thietane, tetrahydrofuran, 1,2-dioxane, 1,4-dioxane, pyrrolidine, piperidine, thiol (R-S-H), sulfide (R-S-R), disulfide (R-S-S-R'), and derivatives thereof (where R can be alkyl or aryl groups), substituted or unsubstituted. Non-limiting examples of aromatic heteroatomic hydrocarbons include furan, pyrrole, thiophene, benzothiophene, dibenzothiophene, pyridine, indole, benzofuran, carbazole, quinoline, isoquinoline, imidazole, oxazole, pyrazole, pyridazine, pyrimidine, purine, phenol, aniline, and derivatives thereof, substituted or unsubstituted. Such heteroatomic hydrocarbons may result in the formation of coke precursors and/or coke, which can have an asphaltene-like structure as shown for example in the following:

[Formula 1]

Chemical tuning of the surface potential or the zeta potential of a contact surface to have a predetermined surface potential or zeta potential of various components in hydrocarbon fluid systems allows selective attraction or repulsion of dissolved or suspended materials in various sections of the hydrocarbon fluid flow path to mitigate coke formation and/or deposition. For example, coke-catalyzing materials, metal ions, heteroatomic hydrocarbons, and/or coke precursors bearing a positive zeta potential or surface potential in the hydrocarbon fluid, adsorb onto a material having a negative zeta potential or surface potential via electrostatic attraction, thereby, removing these materials in the hydrocarbon fluid. At the same time, a surface having a negative zeta potential or surface potential repels negatively charged coke precursors to prevent deposition of these materials. On the other hand, a surface having a positive zeta potential or surface potential repels positively charged coke-catalyzing materials, metal ions, heteroatomic hydrocarbons, and/or coke precursors. At the same time, negatively charged heteroatomic hydrocarbons and/or coke precursors adsorb onto a material having a positive zeta potential or surface potential via electrostatic attraction, thereby, removing these materials in the hydrocarbon fluid.

Figure 1:
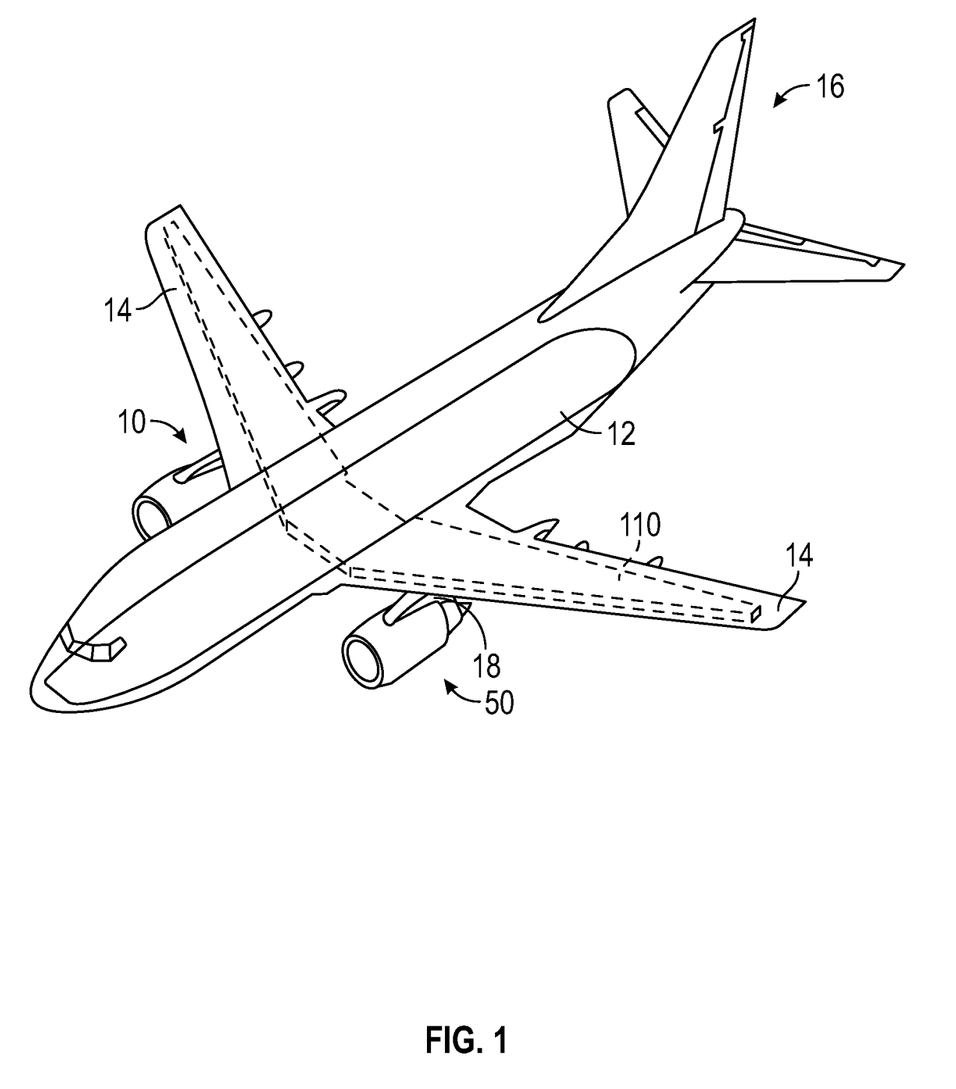
FIG. 1 is a schematic perspective view of an aircraft having a component for mitigating coke formation, according to an embodiment of the present disclosure.

The components, systems, and methods discussed herein are particularly suitable for use in engines, such as a gas turbine engine used on an aircraft. FIG. 1 is a perspective view of an aircraft 10 that may implement various aspects of the present disclosure. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 50. In this embodiment, each engine 50 is attached to one of the wings 14 by a pylon 18 in an under-wing configuration. Although the engines 50 are shown attached to the wing 14 in an under-wing configuration in FIG. 1, in other embodiments, the engine 50 may have alternative configurations and be coupled to other portions of the aircraft 10. For example, the engine 50 may additionally or alternatively include one or more aspects coupled to other parts of the aircraft 10, such as, for example, the empennage 16, and the fuselage 12.

As will be described further below with reference to FIG. 2, the engines 50 shown in FIG. 1 are gas turbine engines that are each capable of selectively generating a propulsive thrust for the aircraft 10. The amount of propulsive thrust may be controlled at least in part based on a volume of fuel provided to the engines 50 via a fuel system 100. An aviation turbine fuel in the embodiments discussed herein is a combustible hydrocarbon liquid fuel, such as a kerosene-type fuel, having a desired carbon number, Jet A, JetA1, JP-8, JP8+100, JP-5, Sustainable Aviation Fuel (SAF), and deoxygenated fuel. The fuel is stored in a fuel tank 110 of the fuel system 100. As shown in FIG. 1, at least a portion of the fuel tank 110 is located in each wing 14 and a portion of the fuel tank 110 is located in the fuselage 12 between the wings 14. The fuel tank 110, however, may be located at other suitable locations in the fuselage 12 or the wing 14. The fuel tank 110 may also be located entirely within the fuselage 12 or the wing 14. The fuel tank 110 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). Preferably, the aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible).

The engine 50 is operable with the fuel system 100 and receives a flow of fuel from the fuel system 100. The fuel system 100 includes a fuel delivery assembly 120, in fluid contact downstream of the fuel tank 110, providing the fuel flow from the fuel tank 110 to the engine 50. The fuel delivery assembly 120 includes tubes, pipes, and the like, to fluidly connect the various components of the fuel system 100 to the engine 50. The fuel system 100 may also include a fuel pump (not shown) in fluid connection with the fuel in the fuel delivery assembly 120. The fuel pump is used to induce the flow of the fuel through the fuel delivery assembly 120 to the engine 50. The fuel pump may generally be the primary source of pressure rise in the fuel delivery assembly 120 between the fuel tank 110 and the engine 50. Optionally, the fuel delivery assembly 120 may include a chemical trap 122 to remove (getter) metal ions, charged heteroatomic hydrocarbons, and/or coke precursors. The chemical trap 122 can be modular and/or replaceable. Optionally, the fuel delivery assembly 120 may include a filter 124 to prevent clogging of the fuel delivery assembly 120. The filter 124 can be modular and/or replaceable. The chemical trap 122 and the filter 124 can remove coke-catalyzing materials, metal ions, heteroatomic hydrocarbons, and/or coke precursors from bulk hydrocarbon fluid, preventing coke formation. Prevention of coke formation in turn prevents deposition and related problems. The chemical trap 122 and the filter 124 can also directly repel or attract charged coke-catalyzing materials, metal ions, charged heteroatomic hydrocarbons, and/or charged coke precursors, if formed, from suitably modified surfaces in the hydrocarbon fluid flow path.

Fuel is injected via the nozzle assembly 130, in fluid contact downstream of the fuel delivery assembly 120, into compressed air and mixed with the compressed, primary air. The nozzle assembly 130 injects fuel into the turbulent airflow of the primary air and the turbulence promotes rapid mixing of the fuel with the primary air. The mixture of the fuel and the compressed air is combusted in the combustion chamber, generating combustion gases (combustion products), which accelerate as the combustion gases leave the combustion chamber. The products of combustion are accelerated as the products are expelled through the outlet of the combustion chamber to drive the engine 50. Non-limiting examples of the fuel include Jet A, JetA1, JP-8, JP8+100, JP-5, SAF, and deoxygenated fuel.

The engine 50 also includes various accessory systems to aid in the operation of the engine 50 and/or an aircraft including the engine 50. For example, the engine 50 may include a lubrication system (not shown) configured to provide a lubricant to, for example, bearings and gear meshes located at various components of the engine 50. The lubricant provided by the lubrication system may increase the useful life of such components and may remove a certain amount of heat from such components. In addition, the lubrication system provides lubrication to an electronic generator (not shown), as well as cooling/heat removal for the electronic generator. The electronic generator may provide electrical power to, for example, a startup electrical motor for the engine 50 and/or various other electronic components of the engine 50 and/or an aircraft including the engine 50. The lubrication systems for the engine 50 may use hydrocarbon fluids, such as oil, for lubrication, in which the oil circulates through inner surfaces of oil scavenge lines. Non-limiting examples of the oil include lubrication oils used in aviation turbines such as type-II oil covered by MIL-PRF-23699 and SAE AS5780 specifications, lubrication oils used in land and sea-based power turbines, and engine and gearbox lubrication oils used in automobiles.

The engine 50 discussed herein is provided by way of example only. In other embodiments, any other suitable engine may be utilized with aspects of the present disclosure. For example, in other embodiments, the engine may be any other suitable gas turbine engine, such as a turbofan engine, a turboshaft engine, a turboprop engine, a turbojet engine, and the like. In such a manner, in other embodiments, the gas turbine engine may have other suitable configurations, such as other suitable numbers or arrangements of shafts, compressors, turbines, fans, etc. In some embodiments, the engine 50 may be a direct drive, fixed-pitch turbofan engine. In other embodiments, a gas turbine engine may be a geared gas turbine engine, may be a variable pitch gas turbine engine, etc. Further, still, in alternative embodiments, aspects of the present disclosure may be incorporated into, or otherwise utilized with, any other type of engine, such as reciprocating engines, as discussed above. Additionally, in still other exemplary embodiments, the exemplary engine 50 may include or be operably connected to any other suitable accessory systems. Additionally, or alternatively, the exemplary engine 50 may not include or be operably connected to one or more of the accessory systems discussed above.

As noted above, various components of the engine 50 contact a hydrocarbon fluid (e.g., fuels and oils) at elevated temperatures. As shown, for example, in FIG. 2, various components of the fuel system 100 are in contact with the hydrocarbon fluid. The component may be, for example, the fuel tank 110, the fuel delivery assembly 120, the nozzle assembly 130, the chemical trap 122, the filter 124, and the lubrication system, and/or any other component that is configured to be in contact with a hydrocarbon fluid, whether that component is in the engine or another system.

Figure 2:
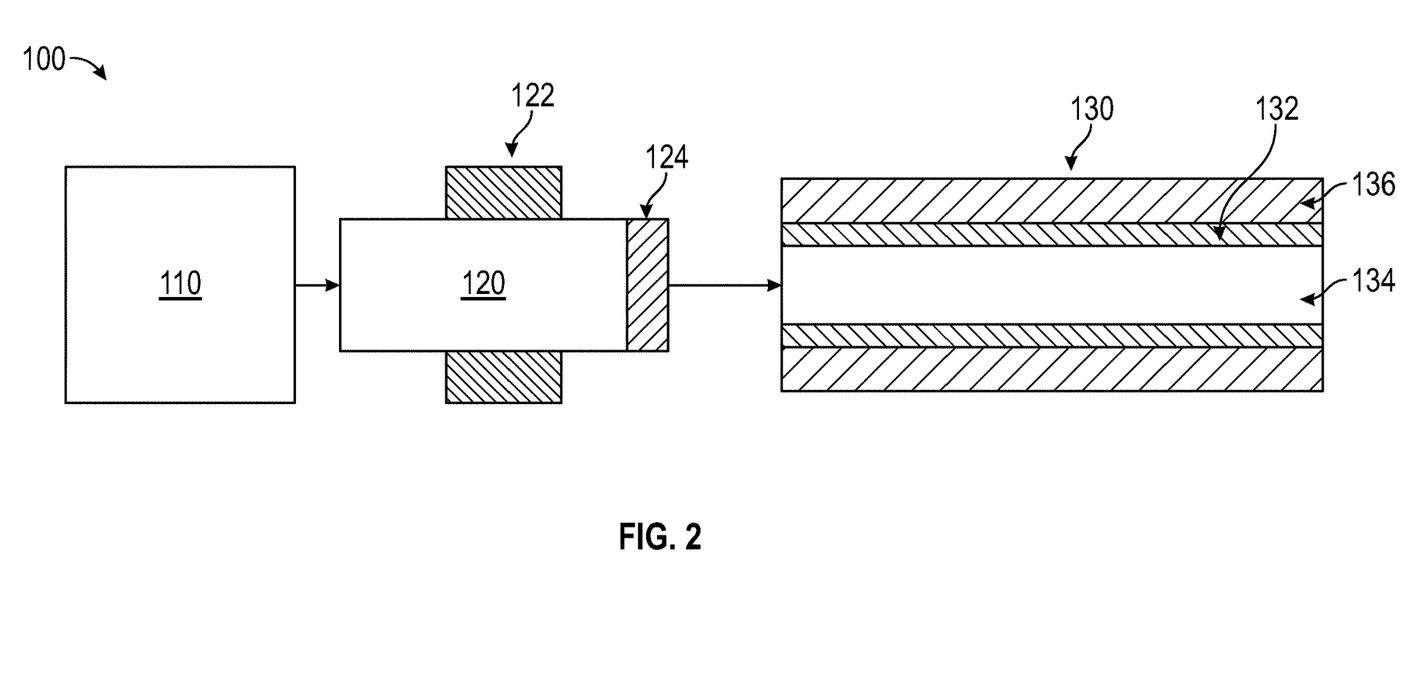
FIG. 2 is a schematic of a system for mitigating coke formation during delivery of a hydrocarbon fluid, according to an embodiment of the present disclosure.

As shown, for example, in FIG. 2, the nozzle assembly 130 includes a fluid passage 134 through which the hydrocarbon fluid is located and flows, as well as a containment wall 136. The containment wall 136 includes a contact surface 132. This contact surface 132 may form the boundary of the fluid passage 134 and, thus, may be a wetted surface or a contact surface that is wetted/contacted by the hydrocarbon fluid in the fluid passage 134. The zeta potential or surface potential of the contact surface 132 can be tailored by surface functionalization or coating such that the contact surface 132 can selectively repel or attract charged coke-catalyzing materials, metal ions, charged heteroatomic hydrocarbons, and/or charged coke precursors, as needed in the fluid passage 134 (and other sections of the hydrocarbon fluid flow path (not shown)) to mitigate coke formation and deposition. The tunability of the zeta potential or surface potential may depend on the chemical end groups of choice. The zeta potential or surface potential of surfaces of other sections of the hydrocarbon fluid flow path can be tailored to mitigate coke formation and deposition. Also, a chemical trap 122 or a filter 124 can be positioned upstream of the nozzle assembly 130, preventing coke formation in bulk hydrocarbon fluid. In addition to tailoring the zeta potential or surface potential of surfaces of the chemical trap 122 or the filter 124, trap or filter material efficacy can be improved by using means to chemically or physically modify the pores and/or surface area. A surface with negative zeta potential or surface potential can repel any negatively charged coke precursor, if formed. Conversely, the surface with a positive zeta potential or surface potential can repel any positively charged species or even dual charges, as needed on inner walls of the nozzle assembly 130 or surfaces of the chemical trap 122 or the filter 124 located in the flow path. Dual charge repelling behavior can be achieved by tuning the surface structure (e.g., channels with appropriate pore size as per the size of the coke precursor molecules) in addition to tuning the zeta potential or surface potential to have a predetermined zeta potential or surface potential.

The contact surface 132 can include a cobalt-chrome alloy, a cobalt-based alloy, a nickel-based alloy, an iron-based alloy, or other suitable materials that are capable of withstanding high temperatures. Non-limiting examples of cobalt-chrome alloys include stellites such as Stellite-6B. Non-limiting examples of cobalt-based alloys include Haynes® 188. Non-limiting examples of nickel-based alloys include Inconel® 600, Inconel® 625, Inconel® 718, Inconel® X-750, Rene N2, N4, N5, N500, and Hastelloy® X. Non-limiting examples of iron-based alloys include stainless steel such as SS-304, SS-316, SS-340, SS-321, and SS-440. One skilled in the art would recognize that certain alloys such as Rene N5, N500, N4, N2, Inconel® 718, Hastelloy® X, and Haynes® 188 are known as superalloys that are capable of withstanding high operating temperatures.

In an embodiment, the temperature of various components of the engine 50 can range between twenty-five to four hundred thirty deg. C, alternatively, between fifty and three hundred deg. C, alternatively, between ninety and two hundred deg. C, alternatively, between twenty-five to one hundred deg. C, alternatively, between one hundred to two hundred deg. C, alternatively, two hundred to three hundred deg. C, or alternatively, three hundred to four hundred thirty deg. C.

In an embodiment, the zeta potential or surface potential of the contact surface of the component configured to be in contact with a hydrocarbon fluid is negative. The zeta potential or surface potential of the contact surface can range between −500 mV and 0 mV, alternatively, between −400 mV and 0 mV, alternatively, between −300 mV and 0 mV, alternatively, between −200 and 0 mV, alternatively, between −100 and 0 mV, alternatively, between −80 mV and 0 mV, alternatively, between −60 mV and 0 mV, alternatively, between −40 mV and 0 mV, or alternatively, between −20 mV and 0 mV. The negative zeta potential or surface potential of the contact surface allows adsorption of any positively charged material present in the hydrocarbon fluid and allows the repulsion of any negatively charged material present in the hydrocarbon fluid. For example, surface functionalization or coating of the contact surface allows the zeta potential or surface potential thereof to be negatively tuned, where coke-catalyzing materials, metal ions, heteroatomic hydrocarbons, and/or coke precursors bearing a positive zeta potential or surface potential in a hydrocarbon fluid, can be absorbed onto the contact surface having a negative zeta potential or surface potential via electrostatic attraction, thereby gettering them from bulk hydrocarbon fluids.

In an embodiment, surface functionalization can induce the negative zeta potential or surface potential of the contact surface. Non-limiting examples of functional groups that can induce the negative zeta potential or surface potential include carboxyl groups, hydroxyl groups, peroxyl groups, sulfate groups, sulfonate groups, phosphate groups, and halide groups. Non-limiting examples of a carboxyl functionalization material include zirconyl 2-ethyl hexanoate, sodium alginate, sodium carboxymethyl cellulose. Non-limiting examples of a hydroxyl functionalization material include ceramics directly synthesized as hydroxides, such as $Zr(OH)_4 \cdot xH_2O$, $Al(OH)_3 \cdot xH_2O$, and $Ti(OH)_4 \cdot xH_2O$, or oxyhydroxides such as $ZrO(OH)_n \cdot xH_2O$. Non-limiting examples of a peroxyl functionalization material include ceramics directly synthesized as peroxides, such as titanium peroxide obtained by reacting titanium hydroxide with hydrogen peroxide. Non-limiting examples of a sulfate functionalization material include sodium alkyl sulfates $[CH_3—(CH_2)_{n-1}—O—SO_3Na]$, such as sodium dodecyl sulfate $(C_{12}H_{25}SO_4Na)$. Non-limiting examples of a sulfonate functionalization material include sodium alkane-1-sulfonates $[CH_3—(CH_2)_{n-1}—SO_3Na]$, such as sodium dodecyl sulfonate $(C_{12}H_{25}SO_3Na)$, sodium dodecylbenzene sulfonate, and sodium dioctylsulfosuccinate. Non-limiting examples of a phosphate functionalization material include dodecyl phosphate, 12-hydroxydodecyl phosphate, and octadecyl phosphoric acid ester $(C_{18}H_{37}OPO(OH)_2)$. Non-limiting examples of a halide functionalization material include hydrofluoric acid, hydrochloric acid, hydrobromic acid, $F_2$, $Cl_2$, $Br_2$, trifluoromethane, trichloromethane, tetrachloroethylene, and hexafluoropropene. These functionalization materials can exist in powder form, isolated form, aqueous form, suspension form, or hydrocarbon solvated form. Introduction of these functionalization materials to the fuel system 100 or the lubrication system can occur prior to or in conjunction with the hydrocarbon fluid injection or circulation.

In an embodiment, coating of negatively charged ceramics can induce the negative zeta potential or surface potential of the contact surface. Non-limiting examples of negatively charged ceramics include silica derivatives ($SiO^-$), silicates, and aluminosilicates. In aluminosilicates, a substitution of $Al^{3+}$ in place of $Si^{4+}$ can result in a negative charge in clay materials. These ceramics can exist in powder form, isolated form, aqueous form, suspension form, or hydrocarbon solvated form. Introduction of these ceramics to the fuel system 100 or lubrication system can occur prior to or in conjunction with the hydrocarbon fluid injection or circulation.

In an embodiment, coating of negatively charged polymers can induce the negative zeta potential or surface potential of the contact surface. Non-limiting examples of negatively charged polymers include polyamides and polyimides. These polymers can exist in powder form, isolated form, aqueous form, suspension form, or hydrocarbon solvated form. Introduction of these polymers to the fuel system 100 or lubrication system can occur prior to or in conjunction with the hydrocarbon fluid injection or circulation.

In an alternate embodiment, the zeta potential or surface potential of the contact surface of the component configured to be in contact with a hydrocarbon fluid is positive. The zeta potential or surface potential of the contact surface can range between 0 mV and 500 mV, alternatively, between 0 mV and 400 mV, alternatively, between 0 mV and 300 mV, alternatively, between 0 mV and 200, alternatively, between 0 mV and 100, alternatively, between 0 mV and 80 mV, alternatively, between 0 mV and 60 mV, alternatively, between 0 mV and 40 mV, or alternatively, between 0 mV and 20 mV. The positive zeta potential or surface potential of the contact surface allows adsorption of any negatively charged material present in the hydrocarbon fluid and allows the repulsion of any positively charged material present in the hydrocarbon fluid. For example, surface functionalization or coating of the contact surface allows the zeta potential or surface potential thereof to be positively tuned, where coke precursors bearing a negative zeta potential or surface potential in a hydrocarbon fluid, can be absorbed onto the contact surface having a positive zeta potential or surface potential via electrostatic attraction, thereby gettering them from bulk hydrocarbon fluids.

In an embodiment, surface functionalization can induce the positive zeta potential or surface potential of the contact surface. Non-limiting examples of functional groups that can induce the positive zeta potential or surface potential include amine groups. Non-limiting examples of an amine functionalization material include permanently charged quaternary ammonium salts such as cetyl trimethyl ammonium bromide (CTAB), cetyl trimethyl ammonium chloride, and dimethyldioctadecylammonium chloride, ethylenediamine, and urea (including ceramic oxides such as $Y_2O_3$ synthesized from $YCl_3 \cdot 6H_2O$ in the presence of urea). These functionalization materials can exist in powder form, isolated form, aqueous form, suspension form, or hydrocarbon solvated form. Introduction of these functionalization materials to the fuel system 100 or the lubrication system can occur prior to or in conjunction with the hydrocarbon fluid injection or circulation.

In an embodiment, coating of positively charged ceramics can induce the positive zeta potential or surface potential of the contact surface. Non-limiting examples of positively charged ceramics include ceramic oxides such as yttrium oxide, aluminum oxide, and zirconium oxide synthesized from respective metal salts (for example, chlorides) in the presence of urea.

In an embodiment, coating of positively charged polymers can induce the positive zeta potential or surface potential of the contact surface. Non-limiting examples of positively charged polymers include polymers having a primary, a secondary, or a tertiary amine functional group that is subject to protonation, and polymers having a quaternary ammonium group. These polymers can exist in powder form, isolated form, aqueous form, suspension form, or hydrocarbon solvated form. Introduction of these polymers to the fuel system 100 or the lubrication system can occur prior to or in conjunction with the hydrocarbon fluid injection or circulation.

Non-limiting examples of other suitable materials for altering the zeta potential or surface potential of the contact surface of the component configured to be in contact with a hydrocarbon fluid include ceramics such as silicon oxide, aluminum oxide, zirconium oxide, titanium oxide, iron oxide, zinc oxide, rare-earth oxides, other transition metal oxides, and spinel oxides (for example, ferrites), polymers such as polymethylsilsesquioxane, polyamide, polyimide, polybenzimidazole, and melamine, graphene, graphene oxide, MAX phases such as $Ti_3AlC_2$, MXenes such as $Ti_3C_2T_x$ where T is a surface functional group including O, OH, H, and Li, phosphorene, and single or multiwalled carbon nanotubes. Each of these materials can be used as is, in a modified form, or in a functionalized form, alone or in conjunction with any of the above-mentioned materials. These materials can exist in powder form, isolated form, aqueous form, suspension form, or hydrocarbon solvated form. Introduction of these materials to the fuel system 100 or the lubrication system can occur prior to or in conjunction with the hydrocarbon fluid injection or circulation.

In an embodiment, the contact surface can be dually charged. The dual charge surface can include both a negatively charged functional group and a positively charged functional group. The negatively charged functional group and the positively charged functional group can exist in the same molecule forming a zwitterionic structure. Alternately, each of the negatively charged functional group and the positively charged functional group independently exists in different molecules. The dual charge surface can include a microchannel (such as a zeolite-type channel). The functionalized or charged interior of the microchannel has a positive zeta potential or surface potential and the functionalized or charged exterior of the microchannel has a negative zeta potential or surface potential. Alternatively, the functionalized or charged interior of the microchannel has a negative zeta potential or surface potential and the functionalized or charged exterior of the microchannel has a positive zeta potential or surface potential.

In an embodiment, the contact surface exhibits dual charge repelling behavior. This can be achieved by using means to chemically or physically modify the surface structure (for example, channels with appropriate pore size as per the size of the coke precursor molecules) in addition to tuning the zeta potential or surface potential to have a predetermined zeta potential or surface potential. Such a contact surface can prevent surface deposition and filter clogging.

Advantageously, the materials used for altering the zeta potential or surface potential contact surface survive from decomposition over the wide range of operating temperatures of the fuel system 100 or the lubrication system.

Advantageously, aspects of the present disclosure are directed to chemically tuning the zeta potential or surface potential of internal surfaces, chemical traps, or filters in fuel/oil systems to have a predetermined zeta potential or surface potential such that they can selectively attract or repel dissolved materials or "insolubles" as needed in various sections of the flow path to mitigate coke formation and deposition. Coke-catalyzing materials, metal ions, heteroatomic compounds, and coke precursors bearing a positive surface charge in hydrocarbon fluids, can be adsorbed onto a material with a negative zeta potential or surface potential, by electrostatic attraction, thereby gettering them from bulk hydrocarbon fluids. Also, mitigation of coke formation and deposition can be achieved via chemical traps or filters (that can be periodically replaced) upstream of the hydrocarbon fluid delivery system, preventing coke formation in bulk hydrocarbon fluid. A surface with negative zeta potential or surface potential can also repel any negatively charged coke precursors, if formed. Conversely, the surface can be tailored to repel positively charged species or even dual charges, as needed on inner walls of a hydrocarbon fluid nozzle assembly, chemical trap, or filter surface in the flow path. Tailoring of the ζ-value of surfaces can be carried out by chemical modification and/or coating methods incorporating chemical end groups on the surface as per the desired surface charge. Choice of chemistry can ensure operability and durability over wide temperature ranges and various hydrocarbon fluid compositions.

Further aspects of the present disclosure are provided by the subject matter of the following clauses.

A component configured to be in contact with a hydrocarbon fluid, the component including, a wall having a contact surface configured to be in contact with the hydrocarbon fluid, where the contact surface has a predetermined zeta potential or surface potential such that the contact surface selectively repels or attracts at least one of coke-catalyzing materials, metal ions, heteroatomic hydrocarbons, or coke precursors.

The component of the preceding clause, where the predetermined zeta potential or surface potential of the contact surface is negative.

The component of any preceding clause, where the contact surface is functionalized with a functional group including at least one of a carboxyl, a hydroxyl, a peroxyl, a sulfate, a sulfonate, a phosphate, or a halide.

The component of any preceding clause, where the contact surface includes at least one of silica, silicate, or aluminosilicate.

The component of any preceding clause, where the contact surface includes a polyamide or a polyimide.

The component of any preceding clause, where the predetermined zeta potential or surface potential of the contact surface is positive.

The component of any preceding clause, where the contact surface is functionalized with an amine group.

The component of any preceding clause, where the contact surface includes a polymer having a primary, a secondary, or a tertiary amine group that is protonated, or a quaternary ammonium group.

The component of any preceding clause, where the contact surface has a dual charge.

The component of any preceding clause, where the contact surface includes both a negatively charged functional group and a positively charged functional group.

The component of any preceding clause, where the contact surface includes a microchannel. An interior of the microchannel is charged opposite to an exterior of the microchannel.

The component of any preceding clause, where the hydrocarbon fluid includes at least one of Jet A, JetA1, JP-8, JP8+100, JP-5, SAF, lubrication oils used in aviation turbines, lubrication oils used in power turbines, or engine and gearbox lubrication oils used in automobiles.

The component of any preceding clause, where the contact surface includes at least one of a cobalt-chrome alloy, a cobalt-based alloy, a nickel-based alloy, or an iron-based alloy.

The component of any preceding clause, where the hydrocarbon fluid includes cations of at least one of lead, copper, zinc, cobalt, iron, nickel, chromium, manganese, vanadium, or magnesium.

The component of any preceding clause, where the coke-catalyzing materials, the metal ions, the heteroatomic hydrocarbons, or the coke precursors include a non-aromatic heteroatomic hydrocarbon of at least one of aziridine, ethylene oxide, thiirane, oxetane, azetidine, thietane, tetrahydrofuran, 1,2-dioxane, 1,4-dioxane, pyrrolidine, piperidine, thiol (R-S-H), sulfide (R-S-R), disulfide (R-S-S-R'), or derivatives thereof.

The component of any preceding clause, where the coke-catalyzing materials, the metal ions, the heteroatomic hydrocarbons, or the coke precursors includes an aromatic heteroatomic hydrocarbon of at least one of furan, pyrrole, thiophene, benzothiophene, dibenzothiophene, pyridine, indole, benzofuran, carbazole, quinoline, isoquinoline, imidazole, oxazole, pyrazole, pyridazine, pyrimidine, purine, phenol, aniline, or derivatives thereof.

A gas turbine engine including, a nozzle assembly, where the component of any preceding clause is the nozzle assembly and the contact surface is an interior surface of the nozzle assembly.

A system for mitigating coke formation, the system including, a tank having a first predetermined zeta potential or surface potential, a fuel delivery assembly fluidly connected downstream relative to the tank, and a nozzle assembly fluidly connected downstream relative to the fuel delivery assembly, where the component of any preceding clause, is one or more of the fuel delivery assembly and the nozzle assembly, and the contact surface is an interior surface of the one or more of the fuel delivery assembly and the nozzle assembly, having a second predetermined zeta potential different than the first predetermined zeta potential such that the contact surface selectively repels or attracts at least one of coke-catalyzing materials, metal ions, heteroatomic hydrocarbons, or coke precursors.

The system of the preceding clause, where the fuel delivery assembly includes a chemical trap, where a zeta potential or surface potential of the chemical trap is negative such that at least one of coke-catalyzing materials, metal ions, heteroatomic hydrocarbons, or coke precursors are removed from the system.

The system of any preceding clause, where the fuel delivery assembly includes a dual charge filter.

The method for mitigating coke formation during delivery of a hydrocarbon fluid, the method including, tuning a zeta potential or surface potential of a contact surface of a component, and injecting or circulating the hydrocarbon fluid such that the contact surface is in contact with the hydrocarbon fluid, where the contact surface selectively attracts or repels at least one of coke-catalyzing materials, metal ions, heteroatomic hydrocarbons, or coke precursors present in the hydrocarbon fluid.

The method of the preceding clause, where the zeta potential or surface potential of the contact surface is negative.

The method of any preceding clause, where the contact surface is functionalized with a functional group comprising at least one of a carboxyl, a hydroxyl, a peroxyl, a sulfate, a sulfonate, a phosphate, or a halide.

The method of any preceding clause, where the contact surface includes at least one of silica, silicate, or aluminosilicate.

The method of any preceding clause, where the contact surface includes a polyamide or a polyimide.

The method of any preceding clause, where the zeta potential or surface potential of the contact surface is positive.

The method of any preceding clause, where the contact surface is functionalized with an amine group.

The method of any preceding clause, where the contact surface includes a polymer having a primary, a secondary, or a tertiary amine group that is protonated, or a quaternary ammonium group.

The method of any preceding clause, where the contact surface has a dual charge.

The method of any preceding clause, where the contact surface includes both a negatively charged functional group and a positively charged functional group.

The method of any preceding clause, where the contact surface includes a microchannel, where an interior of the microchannel is charged opposite to an exterior of the microchannel.

The method of any preceding clause, where the hydrocarbon fluid includes at least one of Jet A, JetA1, JP-8, JP8+100, JP-5, SAF, lubrication oils used in aviation turbines, lubrication oils used in power turbines, or engine and gearbox lubrication oils used in automobiles.

The method of any preceding clause, where the contact surface includes at least one of a cobalt-chrome alloy, a cobalt-based alloy, a nickel-based alloy, or an iron-based alloy.

The method of any preceding clause, where the hydrocarbon fluid includes cations of at least one of lead, copper, zinc, cobalt, iron, nickel, chromium, manganese, vanadium, or magnesium.

The method of any preceding clause, where the coke-catalyzing materials, the metal ions, the heteroatomic hydrocarbons, or the coke precursors include a non-aromatic heteroatomic hydrocarbon of at least one of aziridine, ethylene oxide, thiirane, oxetane, azetidine, thietane, tetrahydrofuran, 1,2-dioxane, 1,4-dioxane, pyrrolidine, piperidine, thiol (R-S-H), sulfide (R-S-R), disulfide (R-S-S-R'), or derivatives thereof.

Although the foregoing description is directed to the preferred embodiments, it is noted that other variations and modifications will be apparent to those skilled in the art, and may be made without departing from the spirit or the scope of the disclosure. Moreover, features described in connection with one embodiment may be used in conjunction with other embodiments, even if not explicitly stated above.

We claim:

1. A component configured to be in contact with a hydrocarbon fluid, the component comprising:
a wall having a contact surface configured to be in contact with the hydrocarbon fluid, wherein the contact surface has a predetermined zeta potential such that the contact surface selectively repels or attracts at least one of coke-catalyzing materials, metal ions, heteroatomic hydrocarbons, or coke precursors.

2. The component of claim 1, wherein the predetermined zeta potential of the contact surface is negative.

3. The component of claim 2, wherein the contact surface is functionalized with a functional group comprising at least one of a carboxyl, a hydroxyl, a peroxyl, a sulfate, a sulfonate, a phosphate, or a halide.

4. The component of claim 2, wherein the contact surface comprises at least one of silica, silicate, or aluminosilicate.

5. The component of claim 2, wherein the contact surface comprises a polyamide or a polyimide.

6. The component of claim 1, wherein the predetermined zeta potential of the contact surface is positive.

7. The component of claim 6, wherein the contact surface is functionalized with an amine group.

8. The component of claim 6, wherein the contact surface comprises a polymer having a primary, a secondary, or a tertiary amine group that is protonated, or a quaternary ammonium group.

9. The component of claim 1, wherein the contact surface has a dual charge.

10. The component of claim 9, wherein the contact surface comprises both a negatively charged functional group and a positively charged functional group.

11. The component of claim 1, wherein the hydrocarbon fluid comprises at least one of Jet A, JetA1, JP-8, JP8+100, JP-5, SAF, lubrication oils used in aviation turbines, lubrication oils used in power turbines, or engine and gearbox lubrication oils used in automobiles.

12. The component of claim 1, wherein the contact surface comprises at least one of a cobalt-chrome alloy, a cobalt-based alloy, a nickel-based alloy, or an iron-based alloy.

13. The component of claim 1, wherein the hydrocarbon fluid comprises cations of at least one of lead, copper, zinc, cobalt, iron, nickel, chromium, manganese, vanadium, or magnesium.

14. The component of claim 1, wherein the at least one of coke-catalyzing materials, metal ions, heteroatomic hydrocarbons, or coke precursors comprises a non-aromatic heteroatomic hydrocarbon of at least one of aziridine, ethylene oxide, thiirane, oxetane, azetidine, thietane, tetrahydrofuran, 1,2-dioxane, 1,4-dioxane, pyrrolidine, piperidine, thiol (R-S-H), sulfide (R-S-R), disulfide (R-S-S-R'), or derivatives thereof.

15. The component of claim 1, wherein the at least one of coke-catalyzing materials, metal ions, heteroatomic hydrocarbons, or coke precursors comprises an aromatic heteroatomic hydrocarbon of at least one of furan, pyrrole, thiophene, benzothiophene, dibenzothiophene, pyridine, indole, benzofuran, carbazole, quinoline, isoquinoline, imidazole, oxazole, pyrazole, pyridazine, pyrimidine, purine, phenol, aniline, or derivatives thereof.

16. A gas turbine engine comprising:
a nozzle assembly,
wherein the component of claim 1 is the nozzle assembly and the contact surface is an interior surface of the nozzle assembly.

17. A system for mitigating coke formation, the system comprising:
a tank having a first predetermined zeta potential;
a fuel delivery assembly fluidly connected downstream relative to the tank; and
a nozzle assembly fluidly connected downstream relative to the fuel delivery assembly,
wherein the component of claim 1 is one or more of the fuel delivery assembly and the nozzle assembly, and the contact surface is an interior surface of the one or more of the fuel delivery assembly and the nozzle assembly, having a second predetermined zeta potential different than the first predetermined zeta potential such that the contact surface selectively repels or attracts at least one of coke-catalyzing materials, metal ions, heteroatomic hydrocarbons, or coke precursors.

18. A component configured to be in contact with a hydrocarbon fluid, the component comprising:
a wall having a contact surface configured to be in contact with the hydrocarbon fluid, wherein the contact surface has a predetermined surface potential such that the contact surface selectively repels or attracts at least one of coke-catalyzing materials, metal ions, heteroatomic hydrocarbons, or coke precursors.

19. The system of claim 17, wherein the fuel delivery assembly comprises a chemical trap, wherein a zeta potential of the chemical trap is negative such that at least one of coke-catalyzing materials, metal ions, heteroatomic hydrocarbons, or coke precursors are removed from the system.

20. The system of claim 17, wherein the fuel delivery assembly comprises a dual charge filter.

* * * * *